Dec. 13, 1938.                H. MOLLY                2,139,906
                             DIFFERENTIAL
                          Filed Sept. 8, 1936
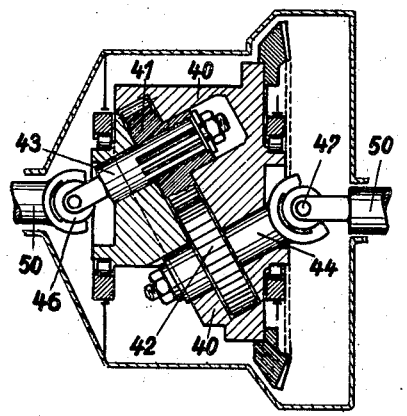
Inventor:
Hans Molly
by S. Sokal.
    Attorney.

Patented Dec. 13, 1938

2,139,906

UNITED STATES PATENT OFFICE 2,139,906

DIFFERENTIAL

Hans Molly, Karlsruhe, Germany, assignor to Zahnradfabrik Friedrichshafen Aktiengesellschaft, Friedrichshafen-on-the-Bodensee, Germany Application September 8, 1936, Serial No. 99,694
In Germany March 29, 1935

3 Claims. (Cl. 74—312)

This invention relates to improvements in balance or differential gearing for road vehicles having an increased self-locking action attained by rendering non-uniform the relative speeds of rotation of the half-axle shafts, the moments of rotation transmitted to the said half-shafts being, owing to this non-uniformity of relative rotation, in inverse ratio to the actual angular velocities of rotation of the said half-shafts.

According to this invention, I provide special means for rendering non-uniform the relative speed of rotation of the half-shafts by arranging a toothed wheel set in the gear casing at such an angle that Cardan joints, connected between the said toothed wheels and the half-shafts, effect only an essentially non-uniform rotary transmission between a half-shaft and the pertaining toothed wheel. Moreover, the two Cardan joints pertaining each to a half-shaft are so angularly displaced with respect to one another that the non-uniform rotary movements of the two half-shafts produced thereby are added to one another.

By this means during uniform rotation of one half-shaft and with stationary gear casing, the other half-shaft is rotated only with an essentially non-uniform speed of rotation. In vehicle operation, therefore, the differential gear has the quality of producing with one vehicle wheel a greater driving power, on the road, which corresponds to the turning moment variation on the half-shafts resulting from the non-uniformity of rotation of the differential gear. This increased driving force is produced, when required for the driving end, definitely, in all cases in which the vehicle wheels rotate with different relative speeds or receive relative changing direction of rotation, for example when driving round curves or when the ground surface varies. It must be particularly mentioned that this increased driving force or the non-uniform distribution of the turning moments on the two half-shafts is not produced by an increased resistance or increased friction in the differential gear.

It has already been proposed to use differential gearing having an inclined toothed wheel set in combination with Cardan joints on the vehicle wheel driving shafts of power vehicles. In this case, however, the inclination of the spur wheel set was small and was only for the purpose of connecting the shafts of these toothed wheels with the shafts of the vehicle wheels to be driven such that the vehicle wheels were not displaced from their horizontal position.

In order that the invention may be fully understood I shall now describe one embodiment thereof by way of example by reference to the accompanying drawing, which shows in sectional elevation a construction in which a set of spur wheels is arranged at an angle with regard to the axis of rotation of the casing in accordance with the invention.

The balance gear contains spur wheels arranged at an angle to the plane of rotation. The gear casing 40 to which is connected the pinion 60 necessary for its driving is rotatably mounted in the vehicle frame in the usual manner and contains internal inclined intermeshing spur wheels 41 and 42 which are arranged at a relatively steep angle to the half axle shafts 50, 50 which are mounted upon corresponding shafts 43 and 44, the latter shaft being connected with the driven half-axle-shafts 50, 50 by means of Cardan joints 46 and 47 producing a non-uniform transmission. Upon turning of one half-axle-shaft the other half-axle-shaft will be rotated in the opposite direction with a relatively stationary gear casing. Owing to the fact that in the Cardan joint itself there is a non-uniform movement a distribution of load results which, depending upon the inclination of the spur wheels, will produce a more or less effective self-locking of the balance gearing.

It will be understood that during normal operation the drive is transmitted from the pinion 60 through the casing 40 to the shafts 43 and 44 and thus to the Cardan joints 46 and 47 and the half axle shafts 50, both shafts thus rotating at a uniform speed and the spur wheels 41 and 42 rotating as a whole with their shafts and the casing 40 and not rotating relatively to one another. On relative rotation between the driving wheels taking place, however, the spur wheels 41 and 42 will be rotated relatively to one another and the drive will then be transmitted through these pinions to the respective shafts 50.

I claim:

1. In a balance gear for driving a road vehicle, the combination of: a main driving shaft; a casing operatively connected to said driving shaft; a pair of spindles carried by said casing and arranged in a plane inclined with respect to the plane of rotation; a pinion carried by one spindle; a second pinion carried by the other spindle and gearing with said first pinion; a Cardan joint connected to each of said spindles; and a half-axle shaft carrying a road wheel connected to each of said Cardan joints, and said Cardan joints being arranged in planes disposed at right angles to one another.

2. A balance gear for driving a road vehicle comprising in combination: a main driving shaft; a pinion carried by said shaft; a casing; a pinion carried by said casing meshing with said first-mentioned pinion; two co-axial half-axle shafts carrying road wheels; spur wheel gearing carried by said casing and arranged in a plane inclined with respect to the plane of rotation and Cardan joints arranged in planes lying substantially at right angles to one another, and said joints operatively connecting said spur gearing with said half-axle-shafts.

3. In a balance gear for driving a road vehicle, the combination of: a main driving shaft; a casing operatively connected to said driving shaft; a pair of spindles carried by said casing and arranged in a plane inclined with respect to the plane of rotation of said casing; a pinion carried by one spindle; a second pinion carried by the other spindle and gearing with said first pinion; a Cardan joint fork connected to one of said spindles; a fork disposed in a plane substantially at right angles to said first mentioned fork and connected to said other spindle; and a co-operating Cardan joint fork carrying a half-axle shaft connected to each of said aforementioned forks for the purpose specified.

HANS MOLLY.